US012746607B2

(12) United States Patent
Kim et al.

(10) Patent No.: US 12,746,607 B2
(45) Date of Patent: Sep. 29, 2026

(54) SYSTEM AND METHOD FOR FORMING OIL MIST IN MACHINING APPARATUS

(71) Applicants: Hyundai Motor Company, Seoul (KR); Kia Corporation, Seoul (KR)

(72) Inventors: MinJun Kim, Ulsan (KR); Hyungjun Ahn, Gimhae-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 381 days.

(21) Appl. No.: 18/535,739

(22) Filed: Dec. 11, 2023

(65) Prior Publication Data

US 2024/0207951 A1 Jun. 27, 2024

(30) Foreign Application Priority Data

Dec. 23, 2022 (KR) ........................ 10-2022-0182501

(51) Int. Cl.
*B23B 51/06* (2006.01)
*F16N 7/32* (2006.01)
*F16N 7/34* (2006.01)

(52) U.S. Cl.
CPC .................................... *B23B 51/06* (2013.01)

(58) Field of Classification Search
CPC .. B23B 51/06; F16N 7/32; F16N 7/34; B23Q 11/10; B23Q 11/1046; B23Q 11/1076;
(Continued)

(56) References Cited

U.S. PATENT DOCUMENTS 1,824,540 A * 9/1931 Oscar ........................ F01M 9/00 184/39.1
3,478,843 A * 11/1969 Eckardt .............. B23Q 11/1046 184/6.26
(Continued)

FOREIGN PATENT DOCUMENTS

EP 1242214 B1 * 4/2004 ............... B23C 5/28
KR 20-0294843 B1 10/2002
(Continued)

OTHER PUBLICATIONS

Kim; Cooling apparatus for cutting oil of machine tool; EPO English Machine Translation; Feb. 5, 2020; pp. 1-7 (Year: 2020).*
(Continued)

*Primary Examiner* — Bayan Salone
(74) *Attorney, Agent, or Firm* — MORGAN, LEWIS & BOCKIUS LLP

(57) ABSTRACT

A system for forming an oil mist for lubrication machining includes a cooled oil storage device configured to store and maintain an oil for lubrication and cooling at a preset temperature, an oil supply line which is connected to the cooled oil storage device and heat-insulated and configured to supply oil from the cooled oil storage device, an indirect cooling device configured to form an indirect cooling air of a first temperature equal to or less than the preset temperature, and to indirectly cool the oil supply line to the first temperature, an oil nozzle configured to form the oil mist by injecting the oil of the first temperature supplied from the cooled oil storage device through the oil supply line, and a direct cooling device configured to form a direct cooling air of a second temperature lower than the first temperature, and to mix and inject the oil mist and the direct cooling air.

20 Claims, 6 Drawing Sheets

(58) Field of Classification Search
CPC ... B23Q 11/122; B05B 1/3405; B05B 7/0416; B05B 7/16; B05B 7/2491; B05B 12/12; F04B 39/16
See application file for complete search history.

(56) References Cited

U.S. PATENT DOCUMENTS

| | | | | | |
|---|---|---|---|---|---|
| 4,919,232 | A * | 4/1990 | Lofton | B23Q 11/1046 184/6.26 |
| 5,226,506 | A * | 7/1993 | Link | F16L 7/02 239/419 |
| 8,215,878 | B2 * | 7/2012 | Rozzi | B23Q 11/1061 407/11 |
| 9,303,813 | B2 * | 4/2016 | Rapchak | F16N 7/32 |
| 2010/0272529 | A1 * | 10/2010 | Rozzi | B23Q 11/1061 408/56 |
| 2022/0219273 | A1 * | 7/2022 | Yabe | B23Q 11/10 |

FOREIGN PATENT DOCUMENTS

| | | | | |
|---|---|---|---|---|
| KR | 200294843 | Y1 * | 11/2002 | |
| KR | 200316355 | Y1 * | 6/2003 | B05B 7/12 |
| KR | 102073555 | B1 * | 2/2020 | B23Q 11/146 |

OTHER PUBLICATIONS

이종항; Device for mixing cold air and oil mist; EPO English Machine Translation; Nov. 13, 2002; pp. 1-6 (Year: 2002).*

* cited by examiner

SYSTEM AND METHOD FOR FORMING OIL MIST IN MACHINING APPARATUS

CROSS-REFERENCE TO RELATED APPLICATION

The present application claims priority to Korean Patent Application No. 10-2022-0182501 filed on Dec. 23, 2022, the entire contents of which is incorporated herein for all purposes by this reference.

BACKGROUND OF THE PRESENT DISCLOSURE

Field of the Present Disclosure

The present disclosure relates to a system and method for forming oil mist in a machining apparatus.

Description of Related Art

In general, a machining apparatus is an apparatus that processes an object by cutting, drilling, or the like, using various tools. Such a machining apparatus utilizes cutting oil (hereinafter referred to as oil) to prevent wear of a tool due to friction, damage to the working object, and the like, during a working process.

Recently, a minimum quantity lubrication machining method that minimizes the use of such oil has been attempted. In the present minimum quantity lubrication machining, oil is sprayed in a form of mist to the work area to reduce the amount of oil used.

On the other hand, to prevent heating of the working object due to heat generated by friction at the processed portion, it is advantageous that the mist formed by oil is formed at a low temperature.

However, when the temperature of the oil mist is lowered, side effects such as freezing of the injector for spraying oil or freezing of moisture in the air sprayed together with the oil may occur.

Therefore, if a system capable of stably forming low-temperature oil mist while minimizing these side effects is provided, it will be advantageous for maintenance of machining apparatus, stability of work results, and the like.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a system and method for forming oil mist in a machining apparatus configured for stably forming oil mist in a low temperature while preventing the problem of moisture freezing.

A system for forming an oil mist for lubrication machining in a machining apparatus includes a cooled oil storage device configured to store and maintain an oil for lubrication and cooling at a preset temperature, an oil supply line which is connected to the cooled oil storage device and heat-insulated and configured to supply oil from the cooled oil storage device, an indirect cooling device configured to form an indirect cooling air of a first temperature equal to or less than the preset temperature, and to indirectly cool the oil supply line to the first temperature, an oil nozzle configured to form the oil mist by injecting the oil of the first temperature supplied from the cooled oil storage device through the oil supply line, and a direct cooling device configured to form a direct cooling air of a second temperature lower than the first temperature, and to mix and inject the oil mist and the direct cooling air.

The cooled oil storage device may include an oil chiller configured to maintain the oil for lubrication and cooling at the preset temperature, and an oil reservoir configured to temporarily store an oil supplied from the oil chiller and supply the stored oil to the oil supply line.

The oil reservoir may include an oil supply pump configured to supply the oil stored in the oil reservoir to the oil supply line, and an oil pressure regulator configured to maintain an output pressure of the oil supply pump at a predetermined pressure.

The indirect cooling device may include at least one indirect cooling line configured to at least partially surround the oil supply line, and at least one indirect cooling air supply device configured to form the indirect cooling air of the first temperature and supply the indirect cooling air to the indirect cooling line.

The at least one indirect cooling air supply device may include an indirect cooling compressor configured to compress and supply air, and at least one indirect cooling vortex tube configured to form the indirect cooling air from the air supplied from the indirect cooling compressor and to supply the indirect cooling air to the at least one indirect cooling line.

A cooled air outlet of the at least one indirect cooling vortex tube may be surrounded by a heat insulation material.

The at least one indirect cooling line may include a first indirect cooling line configured to at least partially surround the oil supply line, and a second indirect cooling line configured to at least partially surround the oil supply line, at a downstream side of the first indirect cooling line. The at least one indirect cooling vortex tube may include a first indirect cooling vortex tube configured to form a first indirect cooling air from the air supplied from the indirect cooling compressor and to supply the first indirect cooling air to the first indirect cooling line, and a second indirect cooling vortex tube configured to form a second indirect cooling air from the air supplied from the indirect cooling compressor and to supply the second indirect cooling air to the second indirect cooling line.

The oil supply line may penetrate the first indirect cooling line and the second indirect cooling line to be connected from the cooled oil storage device to the oil nozzle.

A system may further include an indirect cooling air regulator disposed between the indirect cooling compressor and the at least one indirect cooling line, and configured to control a supply pressure of the indirect cooling air.

The direct cooling device may include a direct cooling compressor configured to compress and supply air, a drying device configured to form a dry air by removing moisture from the air supplied from the direct cooling compressor, a dry air supply line configured to supply the dry air from the drying device, a direct cooling air supply device configured to form the direct cooling air of the second temperature by use of the dry air from the dry air supply line, and a mixture injection device configured to inject the direct cooling air from the direct cooling air supply device to be mixed with the oil mist.

The dry air supply line may penetrate the at least one indirect cooling line to be connected from the drying device to the direct cooling air supply device.

The direct cooling air supply device may include a direct cooling vortex tube configured to form the direct cooling air from the dry air supplied from the dry air supply line and to supply the direct cooling air to the mixture injection device.

The drying device may include an air dryer configured to remove moisture from the air supplied from the direct cooling compressor, a water filter configured to filter water from the air supplied from the direct cooling compressor, and a direct cooling air regulator configured to adjust a supply pressure of the direct cooling air, where the air supplied from the direct cooling compressor is converted to the dry air by passing through the air dryer, the water filter, and the direct cooling air regulator.

The air dryer may include a primary heat-exchanger configured to primarily cool a compressed air while moving the compressed air in a horizontal direction and generally downward, and a secondary heat-exchanger configured to perform cooling by a plurality of cross fins disposed below the primary heat-exchanger and formed perpendicular to a refrigerant line and to remove the moisture by condensing and discharging, where the compressed air is primarily cooled in the primary heat-exchanger through heat exchange with air from which the moisture has been removed in the secondary heat exchanger.

The direct cooling air regulator may include a water separator configured to additionally remove remaining moisture.

A nozzle area of the mixture injection device may be surrounded by a heat insulation material.

The oil nozzle may be configured to form the oil mist by use of the oil of the first temperature supplied through the oil supply line.

A method for forming oil mist in a machining apparatus includes extracting an oil cooled to a preset temperature from a cooled oil storage device, maintaining and supplying the oil below the preset temperature by supplying the extracted oil through an oil supply line configured to penetrate at least one indirect cooling line cooled to a first temperature equal to or less than the preset temperature, forming a direct cooling air of a second temperature lower than the first temperature, and forming an oil mist of the oil and injecting the direct cooling air to be mixed with the oil mist.

The forming of the direct cooling air may include compressing air, removing moisture from the compressed air to form a dry air, primarily cooling the dry air by flowing the dry air through a dry air supply line penetrating the at least one indirect cooling line, and additionally cooling the primarily cooled air through a direct cooling vortex tube.

According to an exemplary embodiment of the present disclosure, oil mist in a low temperature may be stably formed while preventing the problem of moisture freezing which may occur during the process of forming oil mist in a low temperature.

Other effects which may be obtained or are predicted by an exemplary embodiment will be explicitly or implicitly described in a detailed description of the present disclosure. That is, various effects that are predicted according to an exemplary embodiment will be described in the following detailed description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
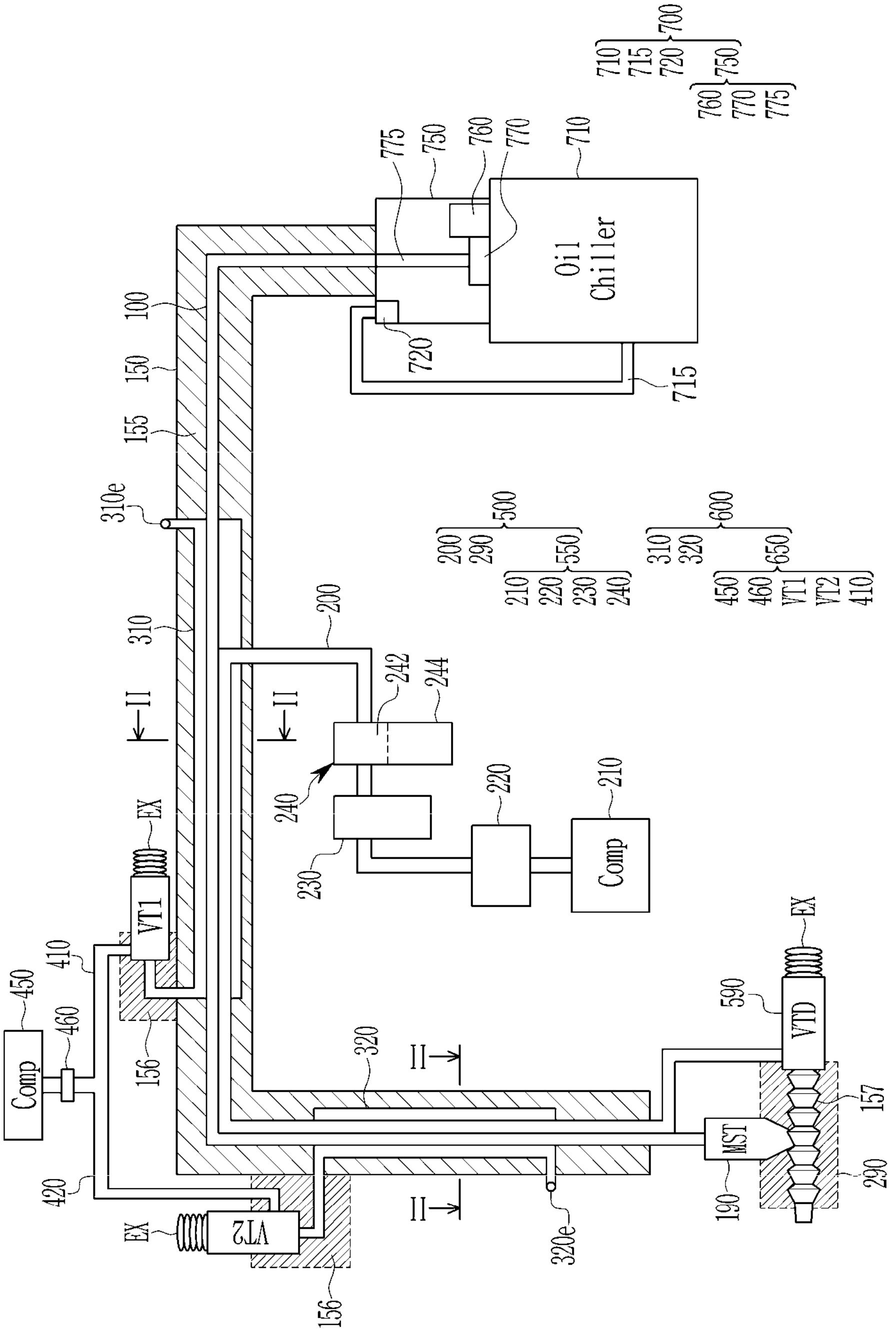
FIG. 1 is a schematic diagram of a system for forming oil mist in a machining apparatus according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments included in the present specification will be described in detail with reference to the accompanying drawings. In the present specification, the same or similar components will be denoted by the same or similar reference numerals, and a repeated description thereof will be omitted.

In describing exemplary embodiments of the present specification, when it is determined that a detailed description of the well-known art associated with the present disclosure may obscure the gist of the present disclosure, it will be omitted. The accompanying drawings are provided only to allow exemplary embodiments included in the present specification to be easily understood and are not to be interpreted as limiting the spirit included in the present specification, and it is to be understood that the present disclosure includes all modifications, equivalents, and substitutions without departing from the scope and spirit of the present disclosure.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be directly connected or coupled to the other component or may be connected or coupled to the other component with a further component intervening therebetween. Furthermore, it is to be understood that when one component is referred to as being "directly connected" or "directly coupled" to another component, it may be directly connected or coupled to the other component without a further component intervening therebetween.

It will be further understood that terms "comprise" and "have" used in the present specification specify the presence of stated features, numerals, steps, operations, components, portions, or combinations thereof, but do not preclude the presence or addition of one or more other features, numerals, steps, operations, components, portions, or combinations thereof.

Terms "unit", "part" or "portion", "-er", and "module" for components used in the following description are used only to easily describe the specification. Therefore, these terms do not have meanings or roles that distinguish them from each other in and of themselves. Furthermore, the terms "unit", "part" or "portion", "-er", and "module" in the specification refer to a unit that processes at least one function or operation, which may be implemented by hardware, software, or a combination of hardware and software.

As used herein, the singular forms are intended to include the plural forms as well, unless the context clearly indicates otherwise. As used herein, the term "and/or" includes any one or all combinations of one or more related items.

In an exemplary embodiment of the present disclosure, oil means a fluid used for lubrication and cooling in a machining apparatus, and it will be understood that it is used in a broad sense including mineral, synthetic, and other various types of fluids.

An exemplary embodiment of the present disclosure is hereinafter described in detail with reference to the drawings.

FIG. 1 is a schematic diagram of a system for forming oil mist in the machining apparatus according to an exemplary embodiment of the present disclosure.

Figure 2:
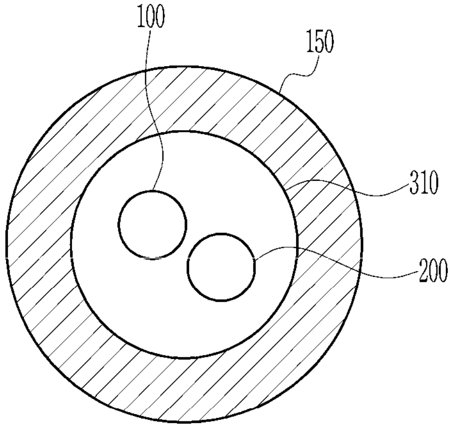
FIG. 2 is a cross-sectional view taken along line II-II of FIG. 1.

FIG. 2 is a cross-sectional view taken along line II-II of FIG. 1.

A system for forming oil mist in the machining apparatus according to an exemplary embodiment of the present disclosure is an oil mist formation system that forms an oil mist for minimum quantity lubrication machining in the machining apparatus.

As shown in FIG. 1, a system for forming oil mist in the machining apparatus according to an exemplary embodiment of the present disclosure includes a cooled oil storage device 700, an oil supply line 100, an indirect cooling device 600, an oil nozzle 190, and a direct cooling device 500.

The cooled oil storage device 700 is configured to store and maintain an oil for lubrication and cooling (hereinafter, briefly called an oil) at a preset temperature.

For example, the cooled oil storage device 700 may include an oil chiller 710 and an oil reservoir 750.

The oil chiller 710 is configured to store the oil for lubrication and cooling, and to cool and maintain the stored oil to the preset temperature, and may be implemented as known to a person skilled in the art.

The oil reservoir 750 may be configured to temporarily store the oil supplied from the oil chiller 710 and supply the stored oil to the oil supply line 100.

In more detail, for example, the oil reservoir 750 may include a reservoir oil supply pump 760 for supplying the oil stored in the oil reservoir 750 to the oil supply line 100, and an oil pressure regulator 770 configured to constantly maintain an output pressure of the reservoir oil supply pump 760.

The oil reservoir 750 includes a chiller oil inflow pump 720 to draw the oil stored in the oil chiller 710 through a chiller oil line 715, and draws the oil from the oil chiller 710.

Furthermore, oil stored in the oil reservoir 750 is supplied to the oil supply line 100 through a reservoir oil line 775 by operation of the reservoir oil supply pump 760.

At the present time, the oil pressure regulator 770 is provided to outlet side of the reservoir oil supply pump 760, and thereby the oil pressure of the oil supply line 100 may be maintained constant. The oil pressure regulator 770 is described and illustrated to be separate from the reservoir oil supply pump 760, but the scope of the present disclosure is not limited thereto. For example, it may be easily understood that the oil pressure regulator 770 may be provided in the reservoir oil supply pump 760.

The cooled oil storage device 700 is described and illustrated to be provided with both of the oil chiller 710 and the oil reservoir 750, but the scope of the present disclosure is not limited thereto. It may be understood that, depending on implementation, variations of omitting any one of the oil chiller 710 and the oil reservoir 750, or integrating the oil chiller 710 and the oil reservoir 750 are possible.

The oil supply line 100 is configured to supply oil from the cooled oil storage device 700, and entirely heat-insulated (refer to hatched portion in FIG. 1). That is, as shown in FIG. 1, the oil supply line 100 is surrounded by a heat insulation material 155, and thus an overall heat-insulated line 150 is formed.

The indirect cooling device 600 is configured to form indirect cooling air of a first temperature equal to or less than the preset temperature of the cooled oil storage device 700, and to indirectly cool the oil supply line 100 to the first temperature.

The oil nozzle 190 is configured to form oil mist by injecting oil of the first temperature supplied from the oil reservoir 750 through the oil supply line 100, and may include at least one oil nozzle.

The direct cooling device 500 is configured to form direct cooling air of a second temperature lower than the first temperature, and to mix and inject the oil mist and the direct cooling air.

According to such a configuration, the oil for lubrication and cooling used in the machining apparatus is configured to stably form the oil mist in a low temperature by primary cooling by indirect cooling and secondary cooling by direct cooling.

That is, oil supplied from the cooled oil storage device 700 is primarily cooled indirectly by the indirect cooling air of the first temperature, the oil of the first temperature is converted to the oil mist by the oil nozzle 190, and the oil mist is directly cooled by being mixed with the direct cooling air of the second temperature lower than the first temperature.

Hereinafter, a line (or passage) refers to a passage through which a fluid may pass, and may be configured in various forms such as, for example, a pipe, a hose, a duct, and the like.

The indirect cooling device 600 may include at least one indirect cooling line 310 and 320 configured to at least partially surround the oil supply line 100, and at least one indirect cooling air supply device 650 configured to form the indirect cooling air of the first temperature and to supply the indirect cooling air to the indirect cooling line 310 and 320.

Here, the at least one indirect cooling air supply device 650 includes an indirect cooling compressor 450, the indirect cooling air regulator 460, and at least one indirect cooling vortex tube VT1 and VT2.

The indirect cooling compressor 450 is configured to compress and supply air, and for example, may be configured to compress and supply an ambient air. The indirect cooling compressor 450 may be provided as an air compressor known to a person skilled in the art, and the present disclosure is not limited to details thereof.

The indirect cooling air regulator 460 is disposed between the indirect cooling compressor 450 and the at least one indirect cooling line 310 and 320, and configured to control a supply pressure of the indirect cooling air supplied to the at least one indirect cooling line 310 and 320.

Therefore, a compressed air compressed by the indirect cooling compressor 450 is pressure-controlled by the indirect cooling air regulator 460, and supplied to the at least one indirect cooling vortex tubes VT1 and VT2 through an indirect cooling compressed air supply lines 410 and 420.

The at least one indirect cooling vortex tubes VT1 and VT2 are configured to form the indirect cooling air from the air supplied from the indirect cooling compressor 450 and to supply the indirect cooling air to the at least one indirect cooling line 310 and 320.

Figure 3:
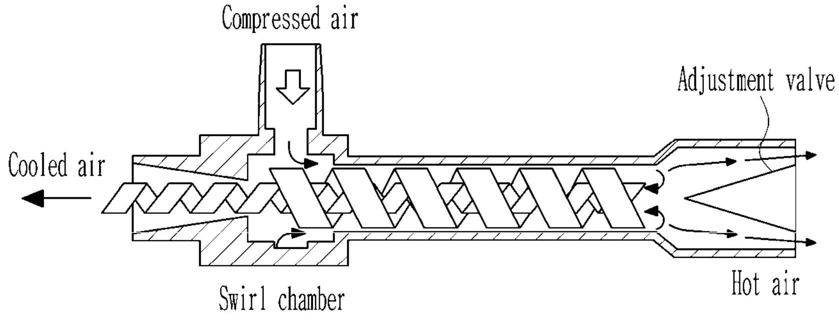
FIG. 3 shows a configuration an operation principle of a vortex tube according to an exemplary embodiment of the present disclosure.

FIG. 3 shows a configuration an operation principle of a vortex tube according to an exemplary embodiment of the present disclosure.

As shown in FIG. 3, in the vortex tubes VT1 and VT2 according to an exemplary embodiment of the present disclosure, when compressed air (e.g., 3 to 10 kg/cm2) is injected into the swirl chamber through the inlet, it accelerates and rotates at high speed. At the instant time, by a conical nozzle (i.e., adjustment valve) at an end portion of the tube (see the right end portion of FIG. 3 and Ex in FIG. 1), only the gas rotating at a large radius from the center portion of the vortex tube escapes outside, and the remaining gas near to the center portion of the vortex tube moves by receiving a force returning in the opposite direction (left direction in FIG. 3). In the present process, the hot air stream escapes through the end portion of the tube, and only the cooled air is discharged in the opposite direction (left direction in FIG. 3) so that the cooled air may be formed.

In an exemplary embodiment of the present disclosure, the at least one indirect cooling line 310 and 320 includes a first indirect cooling line 310 configured to at least partially surround the oil supply line 100, and a second indirect cooling line 320 configured to at least partially surround the oil supply line 100 at a downstream side of the first indirect cooling line 310.

Furthermore, the at least one indirect cooling vortex tubes VT1 and VT2 may be formed as a plurality of vortex tubes, for example, including a first indirect cooling vortex tube VT1 and a second indirect cooling vortex tube VT2.

Here, the first indirect cooling vortex tube VT1 may be configured to form a first indirect cooling air from the air supplied from the indirect cooling compressor 450, and to supply the first indirect cooling air to the first indirect cooling line 310.

The first indirect cooling air cools an interior of the first indirect cooling line 310 while passing through the first indirect cooling line 310, and then discharged through an outlet 310*e*.

The second indirect cooling vortex tube VT2 may be configured to form second indirect cooling air from the air supplied from the indirect cooling compressor 450, and to supply the second indirect cooling air to the second indirect cooling line 320.

The second indirect cooling air cools an interior of an inside of the second indirect cooling line 320 while passing through the second indirect cooling line 320, and then discharged through an outlet 320*e*.

The exemplary embodiment illustrates to include, for example, two indirect cooling vortex tubes VT1 and VT2, but the present disclosure is not limited thereto. Depending on the length of the oil supply line 100 requiring the indirect cooling, three or more indirect cooling vortex tubes may be employed.

In an exemplary embodiment of the present disclosure, a cooled air outlet of the at least one indirect cooling vortex tubes VT1 and VT2 is surrounded by a heat insulation material 156. An outlet region of each of the first indirect cooling vortex tube VT1 and the second indirect cooling vortex tube VT2 is surrounded by the heat insulation material 156.

The heat insulation materials 155 and 156 may be made of any material that provides necessary insulation performance, such as styrofoam, foam tape, etc., and the exemplary embodiment of the present disclosure is not limited to a specific configuration thereof.

FIG. 1 illustrates that the outlet of the first indirect cooling vortex tube VT1 and the outlet of the second indirect cooling vortex tube VT2 are separately surrounded by the heat insulation material 156, but the present disclosure is not limited thereto.

It may be understood that an indirect cooling compressed air supply portion including the outlet of the first indirect cooling vortex tube VT1, the outlet of the second indirect cooling vortex tube VT2, and the indirect cooling compressed air supply line 410 may be surrounded by a single heat insulation material.

Meanwhile, the oil supply line 100 is provided to penetrate the first indirect cooling line 310 and the second indirect cooling line 320 to be connected from the cooled oil storage device 700 to the oil nozzle 190 (refer to FIG. 2).

The oil nozzle 190 is configured to form the oil mist by use of oil of the first temperature supplied through the oil supply line 100. The oil nozzle 190 for injection of the oil in the mist form may be configured as known in the art, and the present disclosure is not limited to details thereof.

Meanwhile, the air required for the oil nozzle 190 to inject the oil in the mist form may be, for example an air supplied by a dry air supply line 200 that will be described later.

The direct cooling device 500 includes a direct cooling compressor 210, a drying device 550, the dry air supply line 200, a direct cooling air supply device 590, and a mixture injection device 290.

The direct cooling compressor 210 is configured to compress and supply air, and for example, may be configured to compress and supply an ambient air. The direct cooling compressor 210 may be provided as an air compressor known to a person skilled in the art, and the present disclosure is not limited to details thereof.

The drying device 550 is configured to form a dry air by removing moisture from the air supplied from the direct cooling compressor 210.

The dry air supply line 200 is configured to supply the dry air from the drying device 550.

The direct cooling air supply device 590 is configured to form direct cooling air of the second temperature by use of the dry air from the dry air supply line 200.

The mixture injection device 290 is configured to inject the direct cooling air from the direct cooling air supply device 590 to be mixed with the oil mist.

The drying device 550 includes an air dryer 220, a water filter 230, and a direct cooling air regulator 240.

The air dryer 220 is configured to remove moisture from the air supplied from the direct cooling compressor 210.

The water filter 230 is configured to filter water from the air supplied from the direct cooling compressor 210.

The direct cooling air regulator 240 is configured to adjust a supply pressure of the direct cooling air.

Meanwhile, the direct cooling air regulator 240 includes a water separator 244 configured to additionally remove remaining moisture. The water separator 244 may be implemented as a configuration known to a person skilled in the art, for example, by including a filter to filter water flowing therethrough.

Therefore, the air supplied from the direct cooling compressor 210 is converted to the dry air by passing through the air dryer 220, the water filter 230, and the direct cooling air regulator 240.

Figure 4:
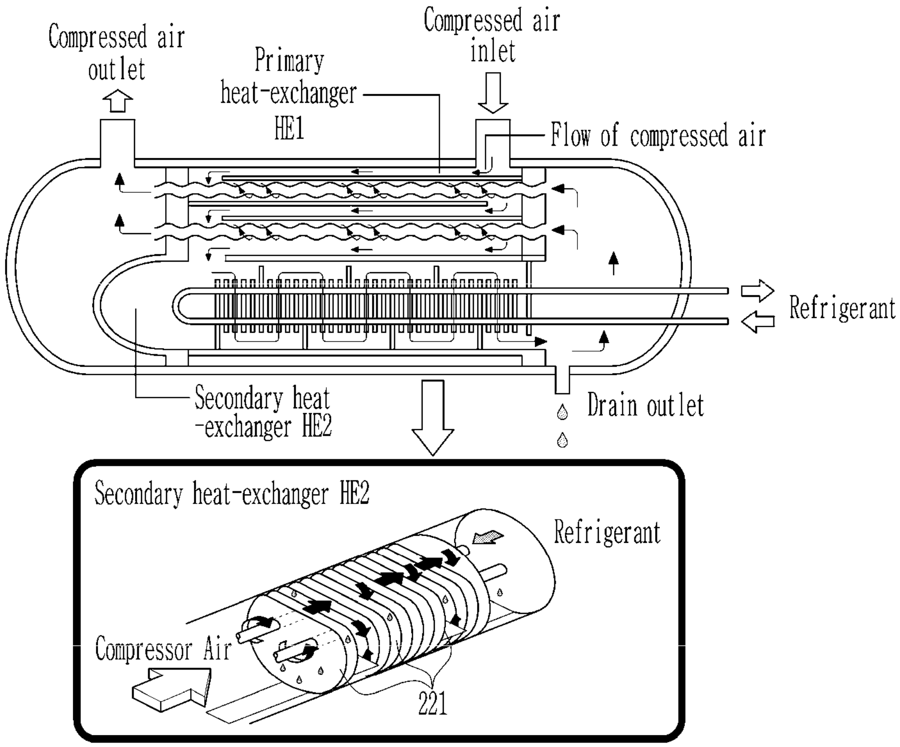
FIG. 4 is a schematic diagram showing a configuration of an air dryer according to an exemplary embodiment of the present disclosure.

FIG. 4 is a schematic diagram showing a configuration of the air dryer 220 according to an exemplary embodiment of the present disclosure.

As shown in FIG. 4, the air dryer 220 includes a primary heat-exchanger HE1 and a secondary heat-exchanger HE2.

The primary heat-exchanger HE1 is configured to primarily cool the compressed air, while moving the compressed air in a horizontal direction and generally downward. At the instant time, the compressed air is primarily cooled in the primary heat-exchanger HE1 through heat exchange with air from which the moisture has been removed in the secondary heat exchanger HE2.

The secondary heat-exchanger HE2 is configured to perform cooling by a plurality of cross fins 221 disposed below the primary heat-exchanger HE1 and formed perpendicular to a refrigerant line and to remove moisture by condensing and discharging. Water droplets and oil droplets may be effectively separated by the structure of the plurality of cross pins 221.

Referring to FIG. 4, the compressed air supplied from the direct cooling compressor 210 is supplied to the primary heat-exchanger HE1 of the air dryer 220 through the compressed air inlet. The compressed air within the primary heat-exchanger HE1 moves left and right in a horizontal direction and generally downward as illustrated by arrows, thereafter being supplied to the secondary heat-exchanger HE2, and is preliminarily cooled by the present process.

In the secondary heat-exchanger HE2, the air is further cooled by heat-exchange with a refrigerant, and moisture may be condensed and discharged during the present process. The air from which moisture is removed while passing through the secondary heat-exchanger HE2 flows from the right chamber to the left chamber to be discharged through the compressed air out let shown in the left in FIG. 4.

Therefore, the compressed air supplied to the primary heat-exchanger HE1 is preliminarily cooled through heat-exchange with the air from which moisture is removed.

Meanwhile, the condensed moisture (i.e., water) in the secondary heat-exchanger HE2 may be discharged through a drain outlet at a bottom portion.

Referring back to FIG. 1, the water filter 230 is configured to filter moisture included in an air supplied from the air dryer 220. Therefore, the remaining moisture after not completely removed by the air dryer 220 may be additionally removed by the water filter 230.

Meanwhile, as described above, the direct cooling air regulator 240 includes the water separator 244 that additionally remove remaining moisture.

That is, the direct cooling air regulator 240 includes the water separator 244 below a regulator portion 242, and is configured to finally remove moisture not removed by the air dryer 220 and the water filter 230, prior to providing the dry air to the dry air supply line 200.

As shown in FIG. 2, the dry air supply line 200 is provided to penetrate the at least one indirect cooling line 310 and 320 to be connected from the drying device 550 to the direct cooling air supply device 590.

The direct cooling air supply device 590 includes a direct cooling vortex tube VTD configured to form the direct cooling air from the dry air supplied from the dry air supply line 200 and to supply the direct cooling air to the mixture injection device 290.

An exemplary configuration of the direct cooling vortex tube VTD will be understood from the foregoing description with reference to FIG. 3.

The mixture injection device 290 may inject the direct cooling air from the direct cooling air supply device 590, to be mixed with the oil mist sprayed by the oil nozzle 190.

Figure 5:
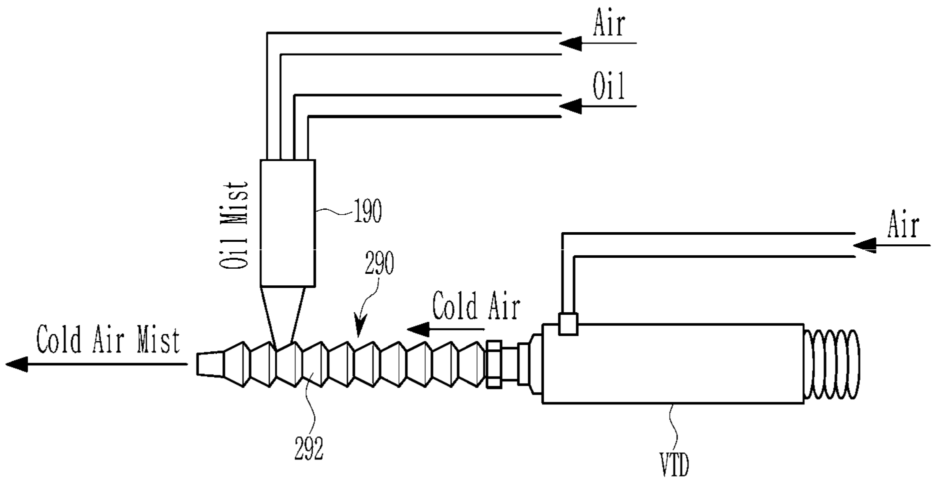
FIG. 5 schematically shows a configuration and operation of a mixture injection device according to an exemplary embodiment of the present disclosure.

FIG. 5 schematically shows a configuration and operation of the mixture injection device 290 according to an exemplary embodiment of the present disclosure.

The direct cooling vortex tube VTD is configured to cool the dry air supplied through the dry air supply line 200 to the second temperature and to supply it into the mixture injection device 290, in which the direct cooling air is inject by an injection line 292 formed within the mixture injection device 290.

At the present time, the oil nozzle 190 sprays the oil mist into the mixture injection device 290 (FIG. 5 shows spraying from top to bottom).

Therefore, the oil mist sprayed by the oil nozzle 190 is mixed with the cooling air of the second temperature in the injection line 292 formed within the mixture injection device 290, and then discharged to the outside thereof.

Meanwhile, the nozzle area of the mixture injection device 290 may be surrounded by a heat insulation material 157. The heat insulation material 157 may be made of any material that provides necessary insulation performance, such as styrofoam, foam tape, etc., and the exemplary embodiment of the present disclosure is not limited to a specific configuration thereof.

Hereinafter, an operation of a system for forming an oil mist for lubrication machining in a machining apparatus according to an exemplary embodiment of the present disclosure is described.

First, the cooled oil storage device 700 stores and maintains the oil at the preset temperature (e.g., 10° C).

The stored oil maintained at the preset temperature (e.g., 10° C) in the cooled oil storage device 700 is supplied to the oil reservoir 750, and then supplied to the oil supply line 100 from the oil reservoir 750.

The oil supply line 100 is connected to the oil nozzle 190 by penetrating the first indirect cooling line 310 and the second indirect cooling line 320. The first indirect cooling line 310 and the second indirect cooling line 320 is maintained at the first temperature equal to or less than the preset temperature (e.g., equal to or less than 10° C). The oil supply line 100, the first indirect cooling line 310, and the second indirect cooling line 320 are entirely surrounded by the heat insulation material 155. Therefore, the oil supplied to the oil nozzle 190 through the oil supply line 100 is supplied to the oil nozzle 190 by being maintained at the preset temperature (i.e., the temperature in a state store in the cooled oil storage device 700) or by being additionally cooled.

This oil is sprayed from the oil nozzle 190 into the mixture injection device 290 in a form of the oil mist.

Meanwhile, to cool the first indirect cooling line 310 and the second indirect cooling line 320 to the first temperature, that is, to supply the cooling air of the first temperature to the first indirect cooling line 310 and the second indirect cooling line 320, the first indirect cooling vortex tube VT1 and the second indirect cooling vortex tube VT2 are employed, and the cooled air outlets of the first indirect cooling vortex tube VT1 and the second indirect cooling vortex tube VT2 are surrounded by the heat insulation material, enhancing indirect cooling performance and preventing moisture penetration.

Meanwhile, the air for direct cooling compressed by the direct cooling compressor 210 is fully removed with moisture while passing through the air dryer 220, the water filter 230, and the direct cooling air regulator 240.

The dry air supply line 200 through which the dry air from which moisture is fully removed is supplied is also disposed to penetrate the first indirect cooling line 310 and the second indirect cooling line 320, to prevent heating of the dry air during the transfer.

Furthermore, the dry air supply line 200 is also disposed to penetrate the first indirect cooling line 310 and the second indirect cooling line 320, and oil and air of the same temperature (i.e., the first temperature equal to or less than the preset temperature) is used to form the oil mist, which enables forming more uniform oil mist.

The dry air supplied through the dry air supply line 200 is supplied to the direct cooling vortex tube VTD, and forms the direct cooling air of the second temperature lower than the first temperature (e.g., −30° C).

The direct cooling air of the second temperature is injected into the mixture injection device 290 to be mixed with the oil mist, and therefore, the oil mist may be additionally cooled (e.g., to a temperature of −15° C) by the direct cooling air before injection.

According to a system for forming oil mist in the machining apparatus according to an exemplary embodiment of the present disclosure, an oil mist of a very low temperature may be formed and sprayed onto a machining portion of the machining apparatus, and therefore, may enhance maintenance characteristic of the machining apparatus, stability of machining result, and the like.

Meanwhile, a method for forming oil mist in the machining apparatus according to various exemplary embodiments of the present disclosure may be implemented by a system for forming oil mist in the machining apparatus according to an exemplary embodiment of the present disclosure.

Figure 6:
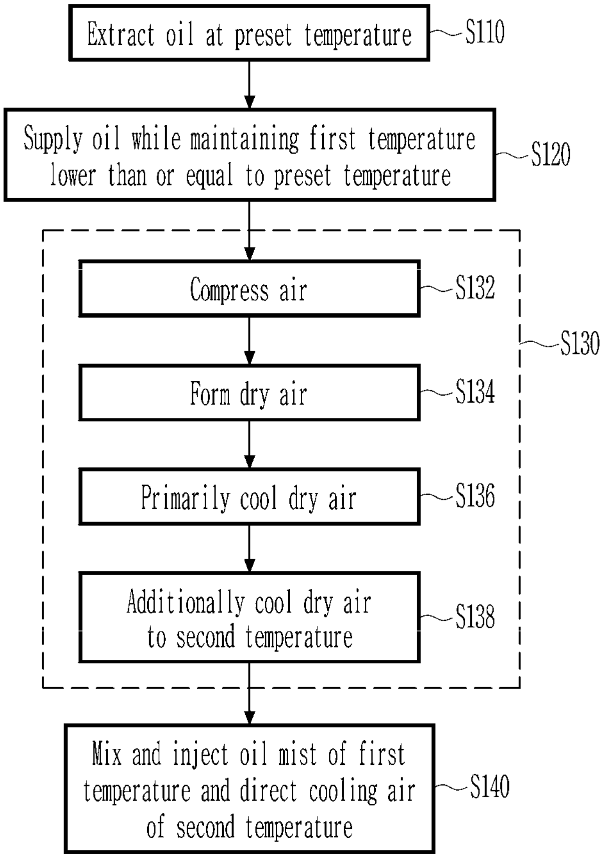
FIG. 6 is a flowchart showing a method for forming oil mist in a machining apparatus according to an exemplary embodiment of the present disclosure.

FIG. 6 is a flowchart showing a method for forming oil mist in the machining apparatus according to an exemplary embodiment of the present disclosure.

Referring to FIG. 6, according to a method for forming oil mist in the machining apparatus according to an exemplary embodiment of the present disclosure, firstly at step S110, the oil cooled to the preset temperature (e.g., 10° C) is extracted from the cooled oil storage device 700.

Subsequently, at step S120, the extracted oil is supplied through the oil supply line 100 penetrating the at least one indirect cooling line 310 and 320 cooled to the first temperature equal to or less than the preset temperature (e.g., 10° C), and accordingly the oil is maintained and supplied below the preset temperature.

Meanwhile, at step S130, the direct cooling air is formed at the second temperature (e.g., −30° C lower than the first temperature.

In more detail, in the process S130 of forming the direct cooling air of the second temperature, the air is compressed by the direct cooling compressor 210 at step S132, moisture is removed from the compressed air by the drying device 550 to form the dry air S134, the dry air is primarily cooled while being supplied passing through the indirect cooling line 310 and 320 at step S136, and additionally cooled by the direct cooling vortex tube VTD at step S138, being finally formed as the direct cooling air.

Subsequently, at step S140, the direct cooling air of the second temperature is injected to be mixed with the oil mist formed from the oil of the first temperature.

According to an exemplary embodiment of the present disclosure, oil mist in a low temperature may be stably formed while preventing the problem of moisture freezing which may occur during the process of forming oil mist in a low temperature.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A system for forming an oil mist for lubrication machining in a machining apparatus, the system comprising:

a cooled oil storage device configured to store and maintain an oil for lubrication and cooling at a preset temperature;

an oil supply line which is connected to the cooled oil storage device and heat-insulated and configured to supply the oil from the cooled oil storage device therethrough;

an indirect cooling device configured to form an indirect cooling air of a first temperature less than the preset temperature, and to indirectly cool the oil supply line to the first temperature;

an oil nozzle configured to form the oil mist by injecting the oil of the first temperature supplied from the cooled oil storage device through the oil supply line; and a direct cooling device configured to form a direct cooling air of a second temperature lower than the first temperature, and to mix and inject the oil mist and the direct cooling air, wherein cooling of the indirect cooling device and cooling of the direct cooling device are separate from each other so that the oil for lubrication and cooling is cooled by the indirect cooling device prior to the direct cooling device and then further cooled by the direct cooling device.

2. The system of claim 1, wherein the cooled oil storage device includes:

an oil chiller configured to maintain the oil for lubrication and cooling at the preset temperature; and an oil reservoir configured to, for a predetermined time period, store the oil supplied from the oil chiller and supply the stored oil to the oil supply line.

3. The system of claim 2, wherein the oil reservoir includes:

an oil supply pump configured to supply the oil stored in the oil reservoir to the oil supply line; and an oil pressure regulator configured to maintain an output pressure of the oil supply pump at a predetermined pressure.

4. The system of claim 1, wherein the indirect cooling device includes:

at least one indirect cooling line configured to at least partially surround the oil supply line; and at least one indirect cooling air supply device configured to form the indirect cooling air of the first temperature and supply the indirect cooling air to the at least one indirect cooling line.

5. The system of claim 4, wherein the at least one indirect cooling air supply device includes:

an indirect cooling compressor configured to compress and supply air; and at least one indirect cooling vortex tube configured to form the indirect cooling air from the air supplied from the indirect cooling compressor and to supply the indirect cooling air to the at least one indirect cooling line.

6. The system of claim 5, wherein a cooled air outlet of the at least one indirect cooling vortex tube is surrounded by a heat insulation material.

7. The system of claim 5, wherein the at least one indirect cooling line includes:

a first indirect cooling line configured to at least partially surround the oil supply line; and a second indirect cooling line configured to at least partially surround the oil supply line, at a downstream side of the first indirect cooling line, and wherein the at least one indirect cooling vortex tube includes:

a first indirect cooling vortex tube configured to form a first indirect cooling air from the air supplied from the indirect cooling compressor and to supply the first indirect cooling air to the first indirect cooling line; and a second indirect cooling vortex tube configured to form a second indirect cooling air from the air supplied from the indirect cooling compressor and to supply the second indirect cooling air to the second indirect cooling line, and wherein the oil supply line is provided to penetrate the first indirect cooling line and the second indirect cooling line to be connected from the cooled oil storage device to the oil nozzle.

8. The system of claim 7, further including an indirect cooling air regulator disposed between the indirect cooling compressor and the at least one indirect cooling line, and configured to control a supply pressure of the indirect cooling air.

9. The system of claim 7, wherein a dry air supply line configured to supply a dry air from a drying device is provided to penetrate the first indirect cooling line and the second indirect cooling line to be connected from the drying device to a direct cooling air supply device.

10. The system of claim 9, wherein the direct cooling air supply device includes a direct cooling vortex tube configured to form the direct cooling air from the dry air supplied from the dry air supply line and to supply the direct cooling air to a mixture injection device.

11. The system of claim 4, wherein the direct cooling device includes:

a direct cooling compressor configured to compress and supply air;

a drying device configured to form a dry air by removing moisture from the air supplied from the direct cooling compressor;

a dry air supply line configured to supply the dry air from the drying device;

a direct cooling air supply device configured to form the direct cooling air of the second temperature by use of the dry air from the dry air supply line; and a mixture injection device configured to inject the direct cooling air from the direct cooling air supply device to be mixed with the oil mist.

12. The system of claim 11, wherein the dry air supply line is provided to penetrate the at least one indirect cooling line to be connected from the drying device to the direct cooling air supply device.

13. The system of claim 12, wherein the direct cooling air supply device includes a direct cooling vortex tube configured to form the direct cooling air from the dry air supplied from the dry air supply line and to supply the direct cooling air to the mixture injection device.

14. The system of claim 11, wherein the drying device includes:

an air dryer configured to remove moisture from the air supplied from the direct cooling compressor;

a water filter configured to filter water from the air supplied from the direct cooling compressor; and a direct cooling air regulator configured to adjust a supply pressure of the direct cooling air, wherein the air supplied from the direct cooling compressor is converted to the dry air by passing through the air dryer, the water filter, and the direct cooling air regulator.

15. The system of claim 14, wherein the air dryer includes:

a primary heat-exchanger configured to primarily cool a compressed air while moving the compressed air in a horizontal direction and downward; and a secondary heat-exchanger configured to perform cooling by a plurality of cross fins disposed below the primary heat-exchanger and formed perpendicular to a refrigerant line and to remove the moisture by condensing and discharging, wherein the compressed air is primarily cooled in the primary heat-exchanger through heat exchange with air from which the moisture has been removed in the secondary heat exchanger.

16. The system of claim 14, wherein the direct cooling air regulator includes a water separator configured to additionally remove remaining moisture.

17. The system of claim 11, wherein a nozzle area of the mixture injection device is surrounded by a heat insulation material.

18. The system of claim 1, wherein the oil nozzle is configured to form the oil mist by use of the oil of the first temperature supplied through the oil supply line.

19. A method for forming oil mist in a machining apparatus, the method comprising:

extracting an oil cooled to a preset temperature from a cooled oil storage device;

maintaining and supplying the oil below the preset temperature by supplying the extracted oil through an oil supply line configured to penetrate at least one indirect cooling line through which an indirect cooling air of a first temperature less than the preset temperature flows;

forming a direct cooling air of a second temperature lower than the first temperature; and forming the oil mist of the oil and injecting the direct cooling air to be mixed with the oil mist, wherein cooling by the indirect cooling air and cooling by the direct cooling air are separate from each other so that the oil is indirectly cooled by the indirect cooling air prior to the direct cooling air and then further cooled directly by the direct cooling air.

20. The method of claim 19, wherein the forming of the direct cooling air includes:

compressing air;

removing moisture from the compressed air to form a dry air;

primarily cooling the dry air by flowing the dry air through a dry air supply line penetrating the at least one indirect cooling line; and additionally cooling the primarily cooled air through a direct cooling vortex tube.

* * * * *